2,777,841

PROCESS FOR THE PRODUCTION OF CAPROLACTAM

Lorraine Guy Donaruma, Woodbury, N. J., assignor to E. I. du Pont de Nemours and Company, Wilmington, Del., a corporation of Delaware No Drawing. Application August 1, 1955, Serial No. 525,792

1 Claim. (Cl. 260—239.3)

The present invention relates to a novel process for the production of lactams. More particularly, the present invention relates to a novel process for the production of ε-caprolactam (caprolactam).

Lactams are used for the production of polyamides suitable for use as fabrics, fibers, films, coating compositions, and the like. Heretofore, the usual preparation of lactams has been by Beckmann rearrangement of cyclic ketoximes. Caprolactam, the most important member of this class, has long been prepared by rearrangement of cyclohexanone oxime, and many modifications and improvements in this process are known in the art. Also, the preparation of lactams from intermediates other than oximes has been evaluated because of the relatively high cost of the oximes. For example, attempts have been made to produce cyclic amides or lactams from cycloalkanone semicarbazones. However, as recently as 1953, Pearson and co-workers (J. Am. Chem. Soc. 75, 5905 (1953)) reported that no caprolactam was obtained when cyclohexanone semicarbazone was added to 99–100% sulfuric acid containing a large excess of sodium nitrite. In view of the potential availability of the cycloalkanone semicarbazones, a successful process for converting the semicarbazones to lactams is desirable.

Accordingly, it is an object of the present invention to provide a process for conversion of cycloalkanone semicarbazones to lactams. It is another object of the present invention to provide a novel process for converting cyclohexanone semicarbazone to caprolactam. Other objects will become apparent as the invention is further described.

I have found that the foregoing objects may be achieved when I react a cycloalkanone semicarbazone and sodium nitrite in sulfuric acid containing at least one mole of water per mole of cycloalkanone semicarbazone.

In accordance with the process of the present invention, a cycloalkanone semicarbazone, e. g., cyclohexanone semicarbazone, and sodium nitrite are mixed in sulfuric acid containing at least one mole of water per mole of cyclohexanone semicarbazone, the reaction mixture is neutralized, and the corresponding lactam is recovered therefrom.

The following example will serve to illustrate a specific embodiment of the method of carrying out the process of the present invention. However, the example should not be construed to limit the invention in any way. The parts in the example are parts by weight.

Example

Thirty-one parts of cyclohexanone semicarbazone was dissolved in 100 parts of 95% sulfuric acid and to this solution was added 21 parts of sodium nitrite dissolved in 50 parts of water, the rate of addition being so regulated as to hold the temperature of the mixture between 50 and 60° C. After completion of the addition, the reaction mixture was stirred at room temperature for approximately one hour. The reaction mixture then was neutralized, extracted with chloroform, the extract dried, and the chloroform removed by distillation. Distillation of the residue under vacuum yielded 8.4 parts of caprolactam, a yield of 35%.

As is shown by the example, a successful conversion of cyclohexanone semicarbazone is obtained when the cycloalkanone semicarbazone and the sodium nitrite are mixed in sulfuric acid containing at least one mole of water per mole of the cycloalkanone semicarbazone. While I do not wish to be limited by any theoretical discussion of the reactions which occur in the present process, a possible explanation of the failure of earlier workers to obtain lactam may lie in the fact that insufficient water was used to convert the semicarbazone to an intermediate which could undergo transformation to a lactam precursor having an electron-deficient nitrogen atom. Therefore, one mole of water per mole of semicarbazone is theoretically required in the present process. However, I prefer to use an excess of water in order to decrease the reaction time.

The foregoing example additionally illustrates a method of recovering the lactam prepared by the process of the present invention. For example, after the cycloalkanone semicarbazone and the sodium nitrite are mixed in the sulfuric acid containing water, the reaction mixture may be neutralized by any suitable basic material and the lactam recovered therefrom, e. g., by extraction.

The cyclohexanone semicarbazone used in the process of the invention may be prepared from cyclohexanone and semicarbazide. The semicarbazone may also be prepared in good yields by the process described in my copending application, Serial No. 525,791, filed August 1, 1955, wherein an aqueous solution of an alkali metal salt of nitrocyclohexane is added to a dilute mineral acid solution of a semicarbazide mineral acid salt.

The process of the present invention has been illustrated by the production of caprolactam. Equally feasible, however, is the production of other lactams from the corresponding cycloalkanone semicarbazones, e. g., the production of δ-valerolactam from cyclopentanone semicarbazone, substituted caprolactams and valerolactams from the semicarbazones of substituted cyclohexanones and cyclopentanones, respectively, ξ-enantholactam from cycloheptanone semicarbazone, and the like.

The invention has been described in detail in the foregoing. It will be apparent to those skilled in the art that many variations are possible without departure from the scope of the invention. I intend, therefore, to be limited only by the following claim:

I claim:

A process for the production of caprolactam which comprises adding cyclohexanone semicarbazone in concentrated sulfuric acid to an aqueous solution of sodium nitrite, said solution containing at least one mole of water per mole of said cyclohexanone semicarbazone and the temperature during said addition being maintained below about 60° C.

No references cited.